(12) United States Patent
Notargiacomo et al.

(10) Patent No.: US 12,507,115 B2
(45) Date of Patent: *Dec. 23, 2025

(54) INTEGRATED RADIO NETWORK WITH MULTI OPERATOR AND MULTI SIGNAL FORMAT FRONTHAUL CAPABILITY

(71) Applicant: John Mezzalingua Associates, LLC, Liverpool, NY (US)

(72) Inventors: Massimo Notargiacomo, Castel Bolognese (IT); Gilberto Brizzi, Clay, NY (US); Franceso Foresta, Faenza (IT); Alessandro Pagani, Bolonga (IT); Giovanni Chiurco, Bolonga (IT); Giulio Gabelli, Bologna (IT); Davide Durante, Bologna (IT); Fabrizio Marchese, Castel S. Pietro Terme (IT); Richard Wank, Dallas, TX (US); Michael Tierney, Skaneateles, NY (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,366

(22) Filed: Jun. 13, 2023

(65) Prior Publication Data

US 2023/0328583 A1 Oct. 12, 2023

Related U.S. Application Data

(63) Continuation of application No. 17/347,932, filed on Jun. 15, 2021, now Pat. No. 11,856,449.

(Continued)

(51) Int. Cl.
*H04W 28/02* (2009.01)

(52) U.S. Cl.
CPC ... *H04W 28/0284* (2013.01); *H04W 28/0289* (2013.01)

(58) Field of Classification Search
CPC ......... H04W 28/0289; H04W 28/0284; H04W 88/085; H04W 28/26
See application file for complete search history.

(56) References Cited

U.S. PATENT DOCUMENTS 10,433,325 B2  10/2019  Muench
2017/0164215 A1  6/2017  Chen et al.
(Continued)

FOREIGN PATENT DOCUMENTS

EP  3082289 A1  10/2016
EP  3531638 A1  8/2019
(Continued)

OTHER PUBLICATIONS

Nasrallah, et al., "Ultra-Low Latency *ULL) Networks: A Comprehensive Survey Covering the IEEE TSN Standard and Related ULL Research", Cornell University, Ithaca NY, Mar. 20, 2018.

*Primary Examiner* — Syed Ali
*Assistant Examiner* — Najeeb Ansari
(74) *Attorney, Agent, or Firm* — BRYAN CAVE LEIGHTON PAISNER LLP

(57) ABSTRACT

Disclosed is an integrated radio network that can host a plurality of network operators, each of which may be transmitting and receiving packetized signals over a fronthaul network. Each of the network operators may have one or more prioritized packet streams whereby a given network operator may have a plurality of prioritized packet streams having a different allocated priority, and the plurality of network operators may have a differentiated priority among each other. The integrated radio network has a switch/monitor that (1) identifies one or more network operators exceeding their respective allocations and mitigates the (Continued)

violation; and (2) identifies fronthaul network bottlenecks and takes action to mitigate the bottleneck by reducing or impeding low priority packet streams.

19 Claims, 9 Drawing Sheets

Related U.S. Application Data

(60) Provisional application No. 63/040,730, filed on Jun. 18, 2020.

(56) References Cited

U.S. PATENT DOCUMENTS

| | | |
|---|---|---|
| 2018/0063847 A1 | 3/2018 | Huang et al. |
| 2019/0254047 A1* | 8/2019 | Ahmed ............. H04W 72/1215 |
| 2020/0136664 A1 | 4/2020 | Goodman et al. |
| 2020/0228210 A1* | 7/2020 | Lapierre ................ H04B 17/29 |
| 2020/0228996 A1 | 7/2020 | Damnjanovic ....... H04W 16/14 |
| 2020/0245344 A1 | 7/2020 | Krishnaswamy et al. |
| 2020/0305159 A1* | 9/2020 | Raghothaman ... H04W 72/0453 |
| 2020/0367062 A1 | 11/2020 | Salahuddeen et al. |
| 2020/0404607 A1 | 12/2020 | Charipadi |
| 2021/0007039 A1 | 1/2021 | Salahuddeen et al. |
| 2022/0078123 A1* | 3/2022 | Lin De Medeiros ... H04L 47/32 |
| 2022/0110017 A1* | 4/2022 | Medeiros .......... H04W 28/0284 |
| 2022/0224464 A1* | 7/2022 | Rakib ................... H04L 5/0037 |

FOREIGN PATENT DOCUMENTS

| | | |
|---|---|---|
| KR | 101580755 B1 | 12/2015 |
| WO | 2015192264 A1 | 12/2015 |
| WO | 2017-070635 A1 | 4/2017 |
| WO | 2017-152982 A1 | 9/2017 |
| WO | 2020092513 A1 | 5/2020 |
| WO | 2021-016271 A2 | 1/2021 |

\* cited by examiner

INTEGRATED RADIO NETWORK WITH MULTI OPERATOR AND MULTI SIGNAL FORMAT FRONTHAUL CAPABILITY

CROSS-REFERENCE TO RELATED APPLICATIONS

This application is a continuation of U.S. patent application Ser. No. 17/347,932, filed on Jun. 15, 2021, which claims the benefit of U.S. Provisional Application No. 63/040,730 filed on Jun. 18, 2020, the contents of which are all hereby incorporated by reference herein in their entirety.

BACKGROUND OF THE INVENTION

Field of the Invention

The present invention relates to wireless communications, and more particularly, to integrated radio systems capable of handling multiple operators and multiple signal formats.

Background

Traditionally, wireless communications networks were built and owned by mobile network operators. The Radio Access Networks (RAN) and other infrastructure elements of these network operators were proprietary and contained special-purpose hardware designed by and for that network operator. In time, Distributed Antenna Systems (DAS) emerged as a solution that enables high-quality continuous coverage in areas such as large buildings, airports, transit systems, stadiums, etc. The DAS deployments of each network operator, as with other infrastructure elements, included proprietary solutions that were only compatible with the network of that network operator. Conventional DAS implementations may have an analog RF network interface whereby the DAS would connect to an RF signal source from a Wireless Base Station (BTS) of that network operator. In this case, the DAS would distribute the RF analog signals to its numerous Remote Units (RU). Other conventional DAS solutions may connect to the network operator's BTSs by a digital signal compatible with the CPRI (Common Public Radio Interface) standard, or by a packetized digital signal according to the eCPRI protocol, which may be transported over Ethernet. In the case of an eCPRI distribution, for a downlink signal, a DAS Point of Interface (POI) receives an analog signal from a BTS, converts it into a time domain digital signal, packetizes the time domain digital signal, and transports the packets to the appropriate RUs over Ethernet. The RU receives the packetized time domain signal, reconstructs the signal and converts it into an analog signal, which it transmits over its antennas. For an uplink signal, the RUs receive am RF signal from one or more wireless devices or User Equipment (UE), converts it into a digital time domain signal, packetizes the signal, and transports the packets to the Point-Of-Interface over Ethernet. The POI then reconstructs the RF analog signal from the packetized data and transmits the RF analog signal to the BTS. The BTS may operate according to one of several conventional RAN technologies, such as 2G, 3G, and LTE.

LTE eNodeBs may communicate with their connected RUs over either a CPRI or eCPRI fronthaul connection. In either case, the DL signals from and the UL signals to the LTE eNodeB are digitized time domain RF signals. In the case of eCPRI, the digitized time domain signal is packetized as described above. LTE eNodeBs and 5G gNodeBs are examples of Baseband Units (BBUs), which perform RAN protocol stack functionality for LTE and 5G, respectively. As used herein, a BBU may connect to a network operator core network via standard packetized digital interfaces and connect to either one or more RUs and/or one or more Distributed Antenna Systems.

5G gNodeB fronthaul communication involves a split in BBU functionality between a Central Unit (CU) and one or more Distributed Units (DU), in order to make optimal use of processes that are better done centrally and closer to the core network and those that are better done remotely and done closer to the network edge. The 5G CU is then connected to the DU via a standardized interface defined by 3GPP. The interface, referred to as F1, provides a GTP (GPRS Tunneling Protocol) over Ethernet connection between the CU and DU.

Another form of functional split is a PHY layer split referred to as the 7.2× split, which is defined by the O-RAN alliance. The 7.2× split occurs within the 5G or LTE PHY layer, enabling a centralization of upper PHY layer processing (in either the eNodeB or gNodeB) and distribution of lower PHY layer processing within the RUs, for both uplink (UL) and downlink (DL). Further to the 7.2× split, the uplink and downlink data relayed between the upper and lower PHY layers comprises frequency domain physical channel data: e.g., PUSCH (Physical Uplink Shared Channel), PDSCH (Physical Downlink Shared Channel), PUCCH (Physical Uplink Control Channel), PRACH (Physical Random Access Channel), etc. Transmission between the upper and lower PHY layers may be done over a packetized network, such as using eCPRI as a transport mechanism for relaying data packets over an Ethernet connection. This may enable upper PHY layer processing to be done at the eNodeB or gNodeB, whereby the lower PHY layer processing may be done at the RU. Any given Central Unit or DU may communicate with a plurality of Remote Units.

Another trend has emerged within the wireless communications industry whereby a single RAN or DAS may be shared by multiple network operators. In this example, a neutral host or venue may provide its own wireless network infrastructure. This trend may give rise to the following complication. Traditional DAS and/or RAN infrastructures are designed and deployed by a given network operator. As such, the network operator may design the system for its anticipated maximum traffic load, given that it is the sole user of that infrastructure. However, in the case of a neutral host or multi-operator network, it may be impossible to anticipate the cumulative loads on the network wrought by multiple network operators and private networks using a single network infrastructure.

Another important feature of preferred modern wireless communications infrastructure is that not only must they provide the most up-to-date services such as 5G, but they should also be backward compatible with LTE eNodeBs, 3G nodeBs, and even 2G BTSs. This presents a significant challenge in rolling out the latest 5G infrastructure.

The RAN and DAS examples described above involve an Ethernet-based fronthaul. A challenge arises in the case of a non-ideal fronthaul network, in which surges in packet traffic may impede or delay packetized signal and synchronization transport, causing bandwidth limitations and/or latency problems. The O-RAN Alliance specification mentions the possibility of a fronthaul-aware scheduler, whereby the MAC scheduler within the CU protocol stack may receive feedback regarding the state of the fronthaul network and make scheduling decisions accordingly, similar to how it would make scheduling decisions based on channel state information and other non-ideal signal transport factors. However, nowhere does the O-RAN specification address the issue of fronthaul-aware scheduling for a fronthaul network shared by multiple network operators using multiple RAN technologies and involving multiple remote units.

Accordingly, what is needed is a fronthaul-aware integrated wireless communications edge network that can simultaneously accommodate multiple network operators and private networks and multiple RAN technologies and is capable of handling surges in traffic demand in a way that is acceptable for its constituent network operators and private networks.

SUMMARY OF THE DISCLOSURE

An aspect of the present disclosure involves a method for allocating fronthaul bandwidth resources among a plurality of network operators within a radio network. The method comprises assigning a hierarchy of priorities to the plurality of network operators, wherein the hierarchy of priorities includes an allocation of fronthaul bandwidth resources; establishing packet-based communications between a plurality of baseband processors and a plurality of remote units, wherein each of the baseband processors corresponds to a respective network operator; routing a plurality of packet streams between each of the plurality of baseband processors and the plurality of remote units; monitoring a fronthaul traffic for one or more of an allocation violation and a congestion anomaly; and based on a result of the monitoring, mitigating the of the allocation violation and the congestion anomaly.

Another aspect of the present disclosure involves a method for allocating fronthaul bandwidth resources among a plurality of network operators within a radio network. The method comprises assigning a hierarchy of priorities to the plurality of network operators, the hierarchy of priorities comprising one or more network types corresponding to each of the plurality of network operators; establishing packet-based communications between a plurality of baseband processors and a plurality of remote units, wherein each of the baseband processors corresponds to a respective network operator; routing a plurality of packet streams between each of the plurality of baseband processors and the plurality of remote units, wherein each of the plurality of baseband processors corresponds to a network operator; monitoring the packet streams for a congestion anomaly; and based on a result of the monitoring, mitigating the congestion anomaly.

DESCRIPTION OF EXEMPLARY EMBODIMENTS

Figure 1:
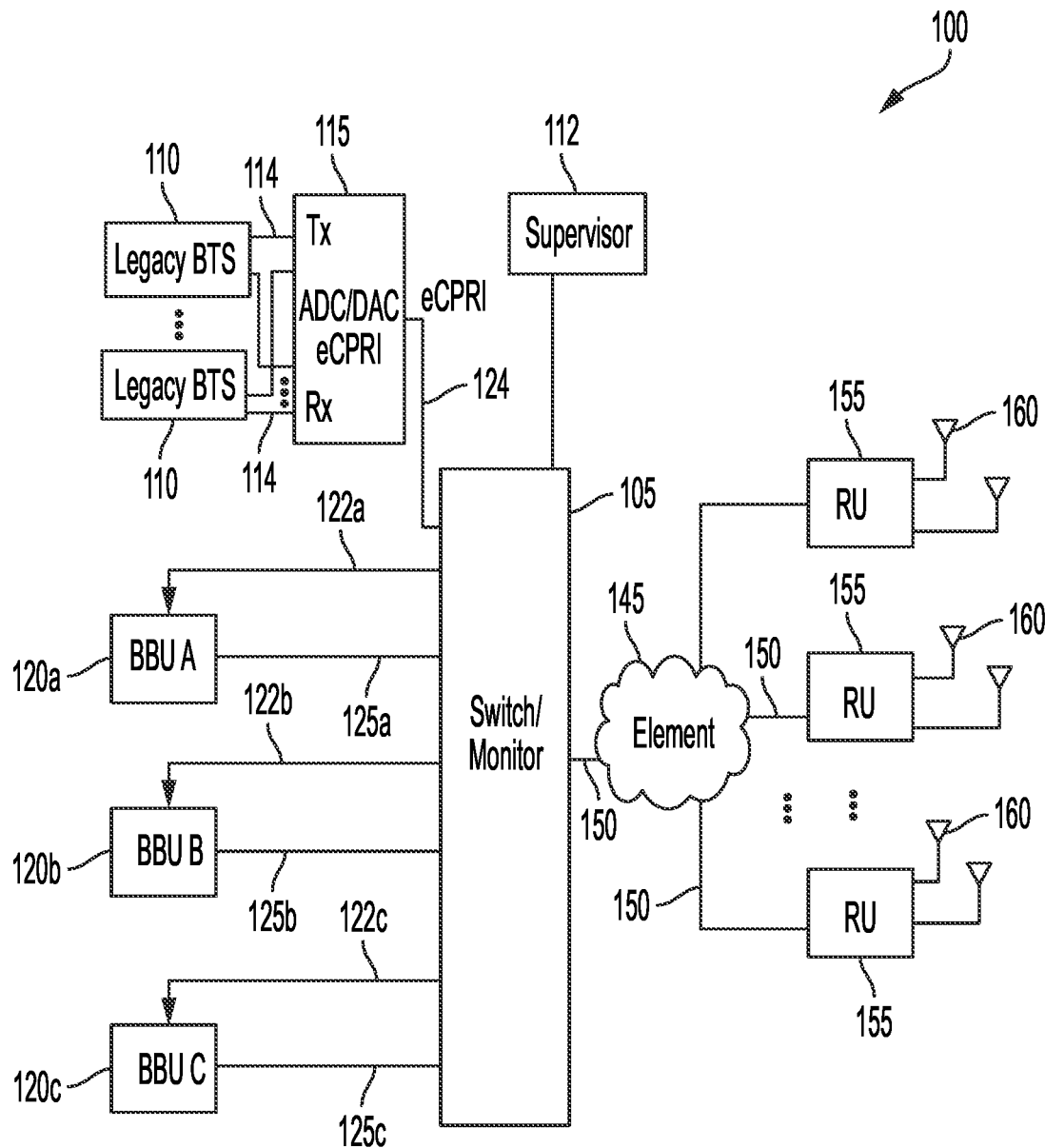
FIG. 1 illustrates an exemplary integrated radio network according to the disclosure.

FIG. 1 illustrates an exemplary integrated radio network 100 according to the present disclosure. Integrated radio network 100 includes a switch/monitor 105. Coupled to switch/monitor 105 is a supervisor module 112; a plurality of legacy BTSs (Base Transceiver Stations) 110, each of which are coupled to switch/monitor 105 through an ADC/DAC unit 115; a plurality of BBUs (Baseband Units) 120*a*-*c*; and a fronthaul network 145 via an Ethernet connection 150. Integrated radio network 100 further includes a plurality of RUs (Remote Units) 155, each of which are coupled to switch/monitor 105 over fronthaul network 145. Each RU 155 may be coupled to one or more antennas 160.

Each of the BBUs 120*a*-*c* may be an LTE eNodeB, or a 5G gNodeB Central Unit (CU) or a combination of 5G gNodeB Central Unit and Distributed Unit (DU); and each of the legacy BTSs 110 may be a 2G, 3G, or LTE base station.

Integrated radio network 100 enables the plurality of RUs 155, individually, collectively, or in any combination, to receive downlink signals from, and transmit uplink signals to, various BBUs 120*a*-*c* and legacy BTSs 110, each of which may belong to a different network operator. The input/output signals 114 of each of the legacy BTSs 110 may comprise an analog RF signal, which would otherwise be coupled directly to a radio. Each input/output signal 114 carrying the analog RF signals for each legacy BTS 110 is coupled to an ADC/DAC unit 115. In the case of a downlink signal from a legacy BTS 110, ADC/DAC unit 115 digitizes the analog RF signal into a digital stream of I/Q (In-phase and Quadrature) data and may convert it according to a packetized digital signal transmission protocol—such as eCPRI—over digitized BTS connection 124. In the case of eCPRI, the digitized signal from a given legacy BTS 110 is packetized and transmitted over BTS connection as input to switch/monitor 105. In the case of an uplink signal intended for a given legacy BTS 110, ADC/DAC unit 115 receives packetized digital I/Q signal data (e.g., eCPRI data) from switch/monitor 105 over BTS connection 124, de-packetizes it and converts it into a digital time domain signal, converts the digital time domain signal into an analog RF signal, and transmits the analog RF signal to the appropriate legacy BTS 100 over input 114. ADC/DAC unit 115 may be a separate component within integrated radio network 100 or may be integrated within switch/monitor 105. It will be understood that such variations are possible and within the scope of the disclosure.

As used herein, the term "network operator" or "operator" may refer to a network operator that owns and operates licensed spectrum, or to a private network, which does not rely on licensed spectrum but instead uses publicly available shared spectrum (e.g., Citizens Broadband Radio Service (CBRS)), or to an entity that has uses both licensed and shared spectrum.

Further, as used herein, the term "subset" may include one or all of the item in question. In other words, a subset of packets in a packet stream may refer to any number of packets within the packet stream, including all of the packets.

Also coupled to switch/monitor 105 are BBUs 120a-c. In the disclosed exemplary embodiment, each BBU 120a-c may be an eNodeB or gNodeB, which exchanges digitized and packetized signals with switch/monitor 105 over connection 125a-c. Each BBU 120a-c may individually exchange digitized signals 125a-c in different formats. Each BBU 120a-c may belong to—or be operated on behalf of—a different network operator.

Each of BBU 120a-c may individually be one of the following: an LTE eNodeB that exchanges frequency domain packetized 7.2× data with one or more RUs 155 via switch/monitor 105 over respective connection 125a-c, whereby the packetized data is transported according to the eCPRI protocol as a transport mechanism; an LTE eNodeB that exchanges packetized time domain or frequency domain I/Q signal data with one or more RUs 155 over connection 125a-c via switch/monitor 105 according to the eCPRI protocol; an LTE eNodeB that exchanges time domain data with switch/monitor 105 over respective connection 125a-c according to the CPRI protocol; a 5G gNodeB CU+DU combination that exchanges frequency domain packetized 7.2× data with one or more RUs 155 via switch/monitor 105 over respective connection 125a-c, whereby the packetized data is transported according to the eCPRI protocol as a transport mechanism; or a 5G gNodeB CU that exchanges packetized data with one or more DU-equipped RUs 155 over connection 125a-c using GTP over Ethernet according to the 3GPP-defined F1 protocol. It will be understood that such variations are possible and within the scope of the disclosure.

Although the above description refers to the O-RAN 7.2× split, it will be understood that other PHY layer split schemes may be used in its place, and that such variations are within the scope of the disclosure. As used herein, the 7.2× split is one example of a PHY layer split scheme, and that such fronthaul packet traffic may be referred to as a split-PHY layer packet stream.

BBUs 120a-c may each have a feedback signal path 122a-c which relays information such as Ethernet fronthaul traffic overload information generated by switch/monitor 105. BBUs 120a-c may use this information for its individual internal scheduler, such as a MAC scheduler (not shown) to adjust its use of component carriers and resource elements within its assigned component carriers for the purpose of reducing its network traffic load over switch/monitor 105. The internal scheduler within each of BBUs 120a-c may function in accordance with known scheduling procedures either defined in the relevant 3GPP technical specifications or based on proprietary scheduler algorithms.

Each of BBUs 120a-c may correspond to different network operators and may operate independently of each other. They may be collocated with integrated radio network 100, or remotely located. It will be understood that such variations are possible and within the scope of the disclosure.

According to the disclosure, all of the BBUs 120a-c that exchange 7.2× signal data with their corresponding one or more RUs 155 are provided synchronization timing from the same timing source as that provided to each of the RUs 155. Similarly, for any packetized data exchanged between any of the BBUs 120a-c and RUs 155, both the particular BBUs 120a-c and RUs 155 must have along with them packetized synchronization streams. These synchronization streams should be prioritized higher than the data streams to ensure that they are not compromised by an overloaded fronthaul network 145. Accordingly, switch/monitor 105 may handle three kinds of packet streams: PTP (Precision Timing Protocol) synchronization streams; packetized data streams; and management data streams.

Figure 2:
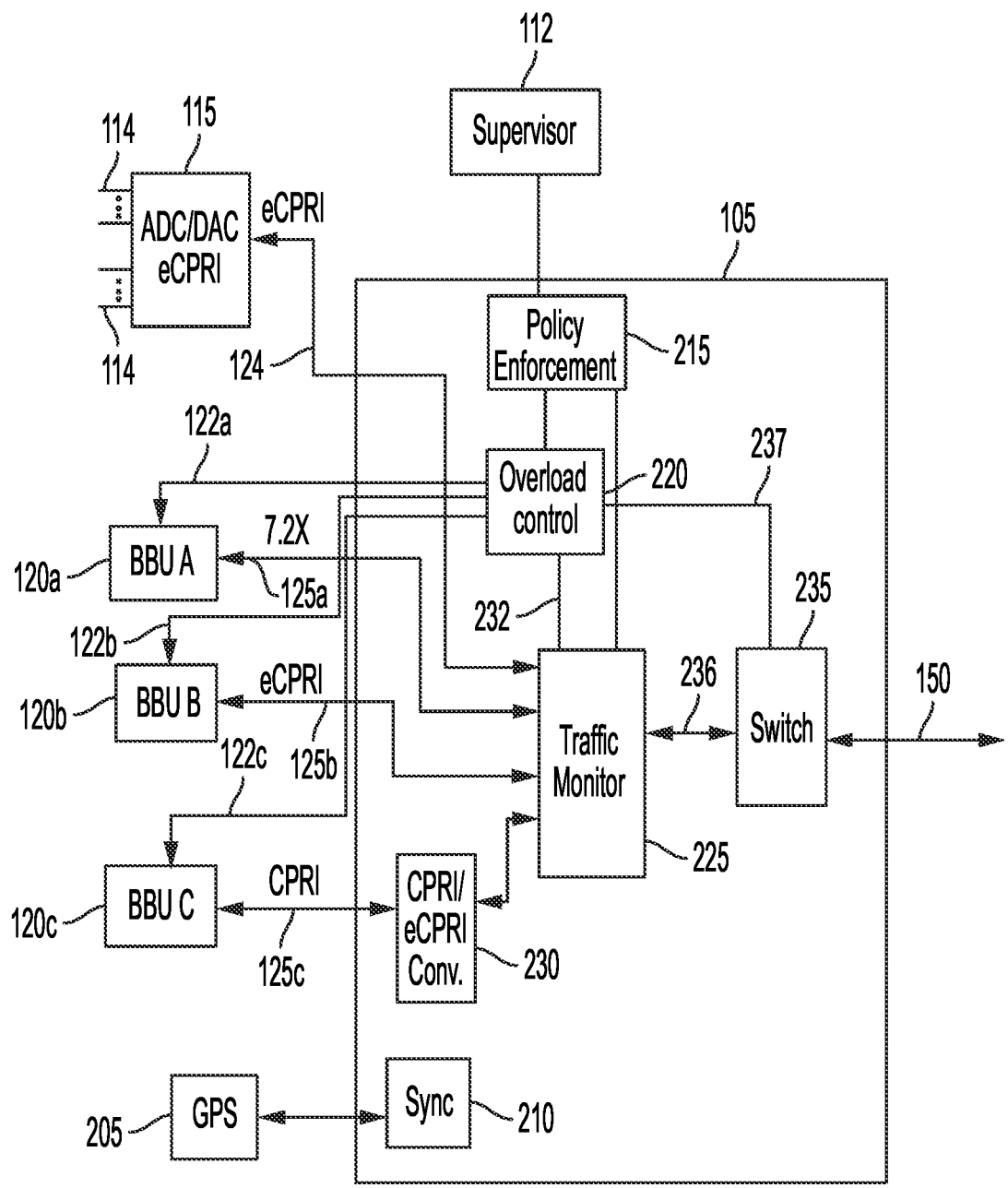
FIG. 2 illustrates an exemplary switch/monitor according to the disclosure.

FIG. 2 illustrates switch/monitor 105 in further detail. As illustrated, switch/monitor 105 is coupled to supervisor module 112, ADC/DAC unit 115 via BTS connection 124; BBUs 120a-c over respective connection 125a-c and feedback signal path 122a-c as described above with reference to FIG. 1.

As illustrated in FIG. 2, switch/monitor 105 includes a policy enforcement module 215, which is coupled to supervisor module 112; an overload control module 220 that is coupled to the policy enforcement module 215 and to each BBU 120a-c over respective feedback signal path 122a-c; a traffic monitor 225 that is coupled to the overload control module 220 over traffic feedback connection 232; a switch 235 that is coupled to traffic monitor 225 over internal Ethernet connection 236 and to overload control module 220 over switch command connection 237. Switch/monitor 105 further includes a CPRI/eCPRI converter 230, which is coupled to traffic monitor 225; and a synchronization module 210 that may be coupled to a GPS receiver 205. Synchronization module 210 may use known systems and techniques, such as Precision Timing Protocol (PTP) and or Synchronous Ethernet (SyncE) technologies, for generating synchronization packet streams for switch/monitor 105 to provide to each BBU 120a-c and RU 155.

Supervisor module 112 may manage the operation of integrated radio network 100, and may be operated by a neutral host, for example. Supervisor module 112 may do the following: maintain allocation and separation of Ethernet resources, such as Ethernet traffic throughput and latency for each BTS 110 and BBU 120a-c according to a subscription model; allocate radio resources, such as power levels and RF channels, within each RU 155 according to a subscription model; and maintain separation of resources such that no BTS 110 or BBU 120a-c may interfere with the function and operation of any others, and that the operation of one BTS 110 or BBU 120a-c does not affect the allocated resources of the BTSs 110 or BBUs 120a-c of other network operators. Supervisor module 112 may coordinate these functions that may be performed by either it or by policy enforcement module 215.

There are several ways in which supervisor module 112 may allocate Ethernet resources among the BTSs 110 and BBUs 120a-c. One way is to statically allocate resources by bandwidth or bit rate throughput, whereby each network operator (to whom each BTS 100 and BBU 120a-c belongs) pays for its corresponding throughput allocation. This may take the form of a paid-for guaranteed bit rate. Accordingly, a network operator seeking a higher Ethernet throughput or guaranteed bit rate may pay more to the neutral host or operator of integrated radio network 100. As mentioned above, the particular resource allocations are managed by supervisor module 112, which in turn provides this information to policy enforcement module 215. Another way to allocate fronthaul network 145 Ethernet resources among the network operators and private networks is to have each customer network operator pay for a guaranteed percentage of available Ethernet throughput, regardless of the available throughput at the time. This might be used in the case of a non-ideal fronthaul connection. In another variation, each network operator may provide internal priorities within its particular spectrum, whereby different channels or carriers corresponding to the network operator may have a hierarchy of prioritization so that in the case of severe network congestion, the supervisor module 112 may selectively disable certain carriers to reduce Ethernet throughput according to a pre-arranged priority. In a further variation, a network operator may provide pre-arranged priority for its use of the network based on traffic type, such as enhanced mobile broadband (eMBB), ultra-reliable low-latency communications (uRLLC), and massive machine-type communications (mMTC). It will be understood that such variations are possible and within the scope of the disclosure. These options are described in more detail below.

Each of the components or modules within integrated radio network 100 may comprise machine readable instructions that are encoded within one or more non-transitory memory devices and executed on one or more processors that perform their respective described functions. As used herein, the term "module" may refer to a set of machine readable instructions encoded in a non-transitory memory that may be executed by one or more processors, whereby the machine readable instructions corresponding to the module perform the described function assigned to that module according to the disclosure. Each of the modules may be executed as one or more execution threads, which may be executed by the one or more processors using container technology, for example. As used herein, "non-transitory memory" may refer to any tangible storage medium (as opposed to an electromagnetic or optical signal) and refers to the medium itself, and not to a limitation on data storage (e.g., RAM vs. ROM). For example, non-transitory medium may refer to an embedded volatile memory encoded with instructions whereby the memory may have to be re-loaded with the appropriate machine-readable instructions after being power cycled. Further, although the disclosed exemplary embodiment involves the use of Ethernet technology for the fronthaul network 145 and switch/monitor 105, it will be understood that other protocols and standards for packet-based digital communications may be possible and within the scope of the disclosure.

Switch/monitor 105 may operate in the context of integrated radio network 100 as follows. For downlink (DL) signals, each legacy BTS 110 transmits signals on its one or more respective carrier frequencies. ADC/DAC unit 115 converts the downlink signals from each legacy BTS 100 into a packetized eCPRI format and transmits it to switch/monitor 105. For a given exemplary BBUs 120*a-c* that outputs a digitized RF signal in a CPRI format, the CPRI/eCPRI converter 230 converts the downlink CPRI format signal into a packetized eCPRI format. Other BBUs 120*a-c* that provide either 7.2×, time domain or frequency domain eCPRI, or F1 formats, do so using by transmitting packetized Ethernet data in the appropriate format. Accordingly, all of the downlink signals input to the switch/monitor 105 are either in an Ethernet format, or in an eCPRI packetized format over Ethernet, or in GTP over Ethernet (F1), all of which are in turn input to traffic monitor 225. Traffic monitor 225 monitors the flow of Ethernet traffic, which includes upload and download signals. In the case of download signals, traffic monitor 225 extracts information from each download signal packet to identify any the following: the source BTS 100 or BBU 120*a-c*, the one or more destination RUs 155, the network operator, the carrier frequency corresponding to the packetized signal, and the traffic type (e.g., uRLLC, eMBB, mMTC, NB-IoT, etc.), using techniques described below, and compiles statistics on the information gathered. In the case of upload signals, traffic monitor 225 receives incoming packets from each RU 155 via fronthaul network 145 and Ethernet connection 150, identifies the destination BTS 110 or BBU 120*a-c*, and routes the packets accordingly. In doing so, traffic monitor 225 gathers statistics on the information gathered, similar to what it does with the download signals. Having obtained this information, traffic monitor 225 identifies the percentage of resources used by each BTS 110 and BBU 120*a-c* (and thus by each network operator and private network) and compares this percentage of resource usage with the percentage allocated to each BTS 110 and BBU 120*a-c* as provided by policy enforcement module 215. This is described in further detail below.

Traffic monitor 225 may also identify aggregate problems in the fronthaul network 145, such as an overload of network traffic, that might impact the time delay of any given packet or lead to the loss of packets between a given RU 155 and a corresponding BTS 110 or BBU 120*a-c*. As used herein, the term "congestion anomaly" may refer to any event in which a surge in packet traffic in fronthaul network 145 may cause a degradation in service for one or more network operators.

If traffic monitor 225 determines that one or more BTSs 110 or BBUs 120*a-c* are using a disproportionately high percentage of the fronthaul network 145 resources (i.e., an allocation violation), or if traffic monitor 225 determines that fronthaul network 145 is experiencing a traffic overload, then traffic monitor 225 may provide this information to overload control module 220 Overload control module 220 may use this information to reduce the network traffic (i.e., mitigate the allocation violation) from/to one or more of the BTSs 110 or BBUs 120*a-c*. Overload control module 220 may do so using pre-arranged policy information from policy enforcement module 215. This is described in further detail below with reference to FIG. 5.

Traffic monitor 225 makes sure each customer's guaranteed bit rate is being met (fixed allocation) or that its corresponding paid-for fronthaul bandwidth percentage is being met (dynamic allocation in a non-ideal fronthaul). This is described in further detail below.

Overload control module 220 may do the following: receive fronthaul bandwidth usage per operator (or per BBU 120*a-c* or BTS 110); compare a given BBU/BTS fronthaul bandwidth usage to its corresponding allocation stored in the policy enforcement module 215; and may either provide corresponding feedback signals 122*a-c* to the BBUs 120*a-c*, or take unilateral action to reduce the fronthaul bandwidth used by a given BBU/BTS, or both; and may calculate a revised fronthaul bandwidth allocation for each BBU/BTS based on the available fronthaul bandwidth determined by traffic monitor 225. In the case in which overload control module 220 provides feedback signals 122*a-c* to the corresponding BBUs 120*a-c*, it may do so over a dedicated Ethernet or IP connection. Alternatively, each feedback signal path 122*a-c* may be implemented within available vendor-specific data placeholders within control plane signaling as enabled by and described in the relevant 3GPP specification. In this case, overload control module 220 may insert feedback signal 122*a-c* into existing 3GPP-defined data structures that are used in control signaling to scheduler (e.g., MAC layer) within the protocol stack implementation of the given BBU 120*a-c*. It will be understood that such variations are possible and within the scope of the disclosure. In a further variation, in addition to congestion control, overload control module 220 may use the data provided by traffic monitor 225 to provide real-time or near real-time usage information to supervisor module 112 for the purpose of billing a given network operator for excessive usage (or reduced usage) of integrated network 100. It will be understood that such variations are possible and within the scope of the disclosure.

In taking unilateral action to reduce the fronthaul bandwidth used by a given BBU/BTS, overload control module 220 may retrieve pre-arranged fronthaul bandwidth reduction steps from policy enforcement module 215. With this information, overload control module 220 may provide instructions to switch 235 via switch command connection 237. Even through a given BBU 120a-c may have a feedback path 122a-c by which overload control module 220 may provide feedback, the feedback might not be sufficiently timely to prevent a buffer/queue overflow within switch 235. Accordingly, overflow control module 220 may need to take immediate unilateral pre-arranged measures to mitigate a network traffic congestion anomaly. How it takes unilateral action is described in further detail below.

Policy enforcement module 215 maintains fronthaul bandwidth allocation information for each BBU 120a-c and BTS 110 (or as a function of network operator, in the case that one network operator may have more than one BBU 120a-c or BTS 110). This may include information regarding pre-arranged steps overload control module 220 may take to reduce fronthaul bandwidth in cases in which a feedback signal path 122a-c is not available.

Switch 235 may be an Ethernet switch or router that connects the components within switch/monitor 105 to fronthaul network 145. Switch 235 may perform conventional buffering and routing functions as well as removing or impeding packets at the command of overload control module 220. Traffic monitor may query the transmit packet buffers or queues within switch 235 to determine traffic congestion. In a variation, switch 235 may have multiple buffers or queues, each having a different priority corresponding to traffic type, etc., to conform to the traffic type's latency requirements. Switch 235 may use higher prioritization for purposes based upon service level, network operator, guaranteed vs best effort traffic, or on any meta data information flagged by sources for the purpose of monitoring congestion and usage/billing. Further, switch 235 may provide separate buffers or queues for high priority packet streams such as synchronization streams from synchronization module 210. It will be understood that such variations are possible and within the scope of the disclosure.

The modules within switch/monitor 105, as illustrated in FIG. 2, are an example of how the functionality within switch/monitor 105 may be partitioned. It will be understood that variations to how the functionality is partitioned and implemented are possible and within the scope of the disclosure. For example, traffic monitor 225 may be integrated within switch 235, overload control module 220 may be integrated within policy enforcement module 215, etc.

Figure 3:
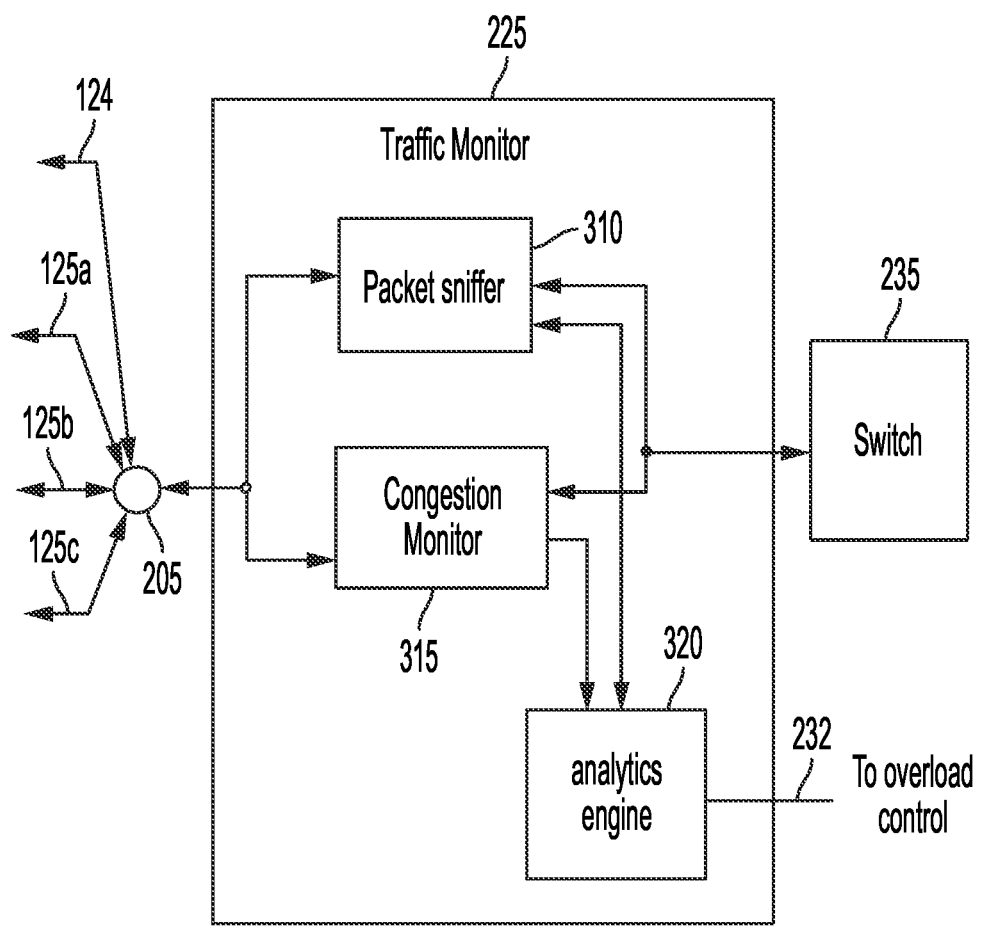
FIG. 3 illustrates an exemplary traffic monitor according to the disclosure.

FIG. 3 illustrates an exemplary traffic monitor module 225 according to the disclosure. Traffic monitor module 225 may include a packet sniffer module 310; a congestion monitor module 315; and an analytics engine module 320. The packet sniffer module 310 may execute instructions to intercept each data packet (UL or DL) and extract information regarding its packet stream type (e.g., synchronization stream, signal data streams, etc.). In the case of signal data streams, packet sniffer module 310 may extract information regarding the a given packet's source/destination BBU 120a-c or BTS 110; source/destination RU 155; network operator; traffic type (uRLLC, eMBB, mMTC); data type (7.2x data, time domain eCPRI I/Q data, frequency domain eCPRI I/Q data, or F1 data); packet priority bits (as specified by IEEE 802.1p); and/or corresponding carrier frequency.

Packet sniffer module 310 may employ the following example approaches to extract information from the packets. One approach is to provide each BBU 120a-c with metadata, such as one or more unique VLAN tags and then have packet sniffer module 310 monitor and accumulate Ethernet traffic data by VLAN ID. A given BBU 120a-c or BTS 110 may be assigned a plurality of VLAN tags for identifying service, priority, traffic type, data type, carrier frequency, device category, and other network slicing information metadata. Additional prioritizations used by a given BBU 120a-c may involve the location of a destination RU. For example, if integrated network 100 is deployed in a stadium, a given network operator may assign a higher priority for an RU 155 located near the first aid station vs. an RU 155 near the bathrooms. Further, a BBU 120a-c may change its RU 155 priority over time depending on expected usage. For example, the RUs 155 in a stadium concourse or parking lot may have priority before and after an event, whereby the RUs 155 in the stadium bowl may have higher priority during the event. It will be understood that such variations are possible and within the scope of the disclosure. For each legacy BTS 110, for the downlink, the ADC/DAC 115 may assign unique VLAN tags to each carrier from each legacy BTS 110 so that the given carrier's packets may be identified by traffic monitor module 225, which may include network operator and carrier frequency, for example.

For the uplink, each RU 155 may insert the appropriate VLAN tag, identifying the BBU, BTS, service, priority, etc., similarly to what may be done at the downlink as described above. Each VLAN tag may have a set of priority bits that can be used to separate out individual services provided by the given network operator. Another approach involves assigning a range of VLAN tags to each BBU 120a-c or network operator of a given BTS 110 so that the BBU 120a-c or BTS 110 can designate and point out its own differentiated and prioritized services to switch/monitor 105 via traffic monitor module 315.

Packet sniffer module 310 may also identify synchronization packet streams from synchronization module 210 and may send information to overload control module 220 and/or switch 235 indicating that the identified packets may be given highest priority.

Packet sniffer module 310 may accumulate or buffer the above-mentioned packet metadata data it collects over a set interval and provide it to analytics engine module 320.

Congestion monitor module 315 assesses the state of congestion of the fronthaul network 145 in the aggregate to determine the current bandwidth or throughput of the fronthaul network 145. There are various approaches by which congestion monitor module 315 may do this. For example, congestion monitor module 315 may include remote agent modules (not shown) within switch 235 and in each of the RUs 155. Each of the remote agent modules monitors the depth of the transmit packet buffers where it is deployed. Each remote agent module may provide information to congestion monitor module 315 regarding the depth of its corresponding transmit packet buffers or queues as well as an indication or alarm if any of them are overflowing. An overflowing transmit packet buffer may indicate that the fronthaul network 145 is transmitting more packets than either the switch 235 or the given RU 155 can handle at a given time. Another (or additional) approach congestion monitor module 315 may employ involves measuring one-way packet delay time. The eCPRI specification provides for such a one-way packet delay measurement. In addition, congestion monitor module 315 may employ conventional tests, such as RFC2544, Y.1564, and RFC5357 (also known as Two-Way Active Measurement Protocol (TWAMP)), which are supported by routers and switches. It will be understood that such variations are possible and within the scope of the disclosure.

Analytics engine module 320 receives data from congestion monitor module 315 and packet sniffer module 310 and may calculate the following: the overall available bandwidth of fronthaul network 145; and the actual bandwidth usage of each BBU 120*a-c* and BTS 110, which may include for each BBU 120*a-c* and BTS 110 the bandwidth usage as a function of traffic type (uRLLC, eMBB, mMTC), carrier frequency, data type (7.2× data, frequency domain eCPRI I/Q data, time domain eCPRI I/Q data, or F1 data), packet priority bits (as specified by IEEE 802.1p), and/or LTE UE-Category. Analytics engine module 320 may calculate available bandwidth at a preset interval (e.g., one Transmit Time Interval (TTI)), or when prompted by congestion monitor 315, because the overall available bandwidth on fronthaul network 145 may change dynamically, which may affect how bandwidth is allocated among the network operators (via their respective BBUs/BTSs), as is described in further detail below. Analytics engine module 320 may further identify causes of traffic congestion bottlenecks in fronthaul network 145 by executing instructions to correlate anomalous surges in data traffic with possible BBU/BTS sources as well as traffic type, data type, etc.

As used herein, the term prioritized packet stream may refer to a given packet stream of a given network operator (i.e., BBU 120*a-c*, or legacy BTS 110) wherein the given packet stream carries signal data corresponding to a specific channel/carrier, a traffic type (uRLLC, eMBB, mMTC), a data type (7.2× data, frequency domain eCPRI I/Q data, time domain eCPRI I/Q data, or F1 data), packet priority bits (as specified by IEEE 802.1p), or carrier frequency. Signal data of a given network operator may be differentiated and prioritized according to any of these classifications, and may be further prioritized across network operators, whereby each network operator may pay for its internally differentiated and operator-differentiated priority.

Figure 4:
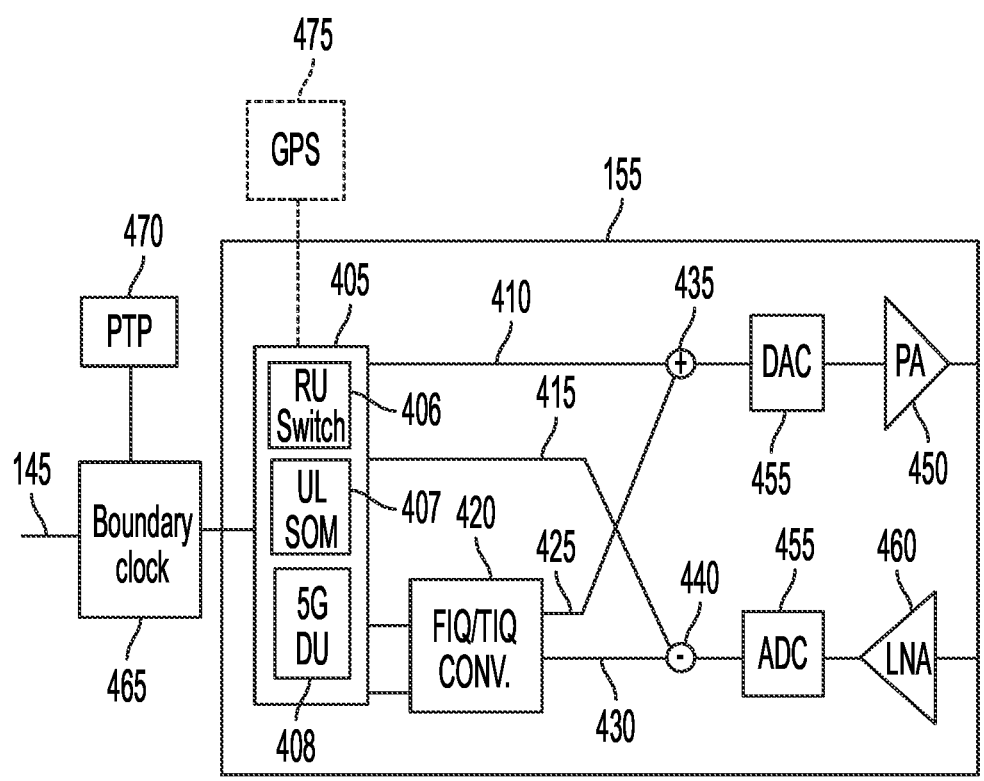
FIG. 4 illustrates an exemplary remote unit according to the disclosure.

FIG. 4 illustrates an exemplary remote unit (RU) 155 according to the disclosure. RU 155 is configurable to communicate with each BBU 120*a-c* and BTS 110 according to its own digital data format (7.2×, frequency domain eCPRI, time domain eCPRI, or F1) via switch/monitor 105. RU 155 may have a boundary clock 465 for network synchronization with each of the other elements of integrated network 100 coupled to the fronthaul network 145 according to a precision timing protocol (PTP 470). Additionally, RU 155 may obtain further network timing assistance via a GPS receiver 475. The timing provided by PTP 470 should be the same as that provided to the BBUs 120*a-c*. Given that each RU 155 is being shared by BBUs 120*a-c* from different network operators, the network hosting the RUs 155 and switch/monitor 105 should provide the PTP timing back into the individual BBUs so they can sync with a given RU 155 where they converge.

RU 155 has a frontend data processor 405 that includes an Ethernet switch 406; an uplink data summing module 407; and a 5G Distributed Unit 408, which works in conjunction with counterpart BBUs 120*a-c* that perform 5G CU functionality, forming a functional 5G gNodeB. 5G DU 408 receives downlink F1 data packets from its corresponding CU within BBU 120*a-c* via fronthaul network 145 and Ethernet switch 406 and performs lower PHY level processing on the data according to the 3GPP specification, thereby generating time domain downlink I/Q data. For the uplink, 5G DU 408 receives uplink time domain data from ADC 455 (via digital splitter 440) and performs uplink lower PHY layer processing, converting it into uplink frequency domain F1 packet data that it transmits onto the fronthaul network 145 via Ethernet switch 406. 5G DU 408 may also include a module for performing low PHY layer processing for those BBUs 120*a-c* (e.g., LTE eNodeB or 5G gNodeB CU+DU) that communicate with the RU 155 using 7.2× packetized data.

RU 155 further includes a FIQ/TIQ converter 420, which converts frequency domain eCPRI I/Q data into a time domain digital I/Q signal stream for the downlink; and converters time domain digital I/Q signal data into frequency domain I/Q data for the uplink. Although illustrated as a separate module, FIQ/TIQ converter 420 may be integrated into frontend data processor 405. RU 155 may include a digital summer 435 that sums digital time domain I/Q data streams 410 from the Ethernet switch 406 and the digital time domain I/Q data stream 425 from the FIQ/TIQ converter 420. The summed digital I/Q data is then converted to an analog RF signal by DAC 445, the output of which is fed to power amplifier 450 and then transmitted via antenna 160.

For the uplink, low noise amplifier 460 amplifies the RF signal received by antenna 160 and feeds the amplified signal to ADC 455. ADC 455 converts the RF analog signal into a digital I/Q data stream that digital splitter 440 routes to frontend data processor 405 via connection 415 and FIQ/TIQ converter 420 via connection 430. If RU 155 has multiple antennas 161, each with a corresponding low noise amplifier 460 and ADC 455, then uplink summer 407 may sum the time domain digital I/Q data into a single digital I/Q data stream that frontend data processor 405 then converts to packetized time domain data using an eCPRI format. In a variation, the FIQ/TIQ converter 420 may take the summed output of uplink summer 407 and convert the summed time domain I/Q data into frequency domain I/Q data, which may then be packetized into an eCPRI format. Frontend data processor 405 may transmit all of the packetized data over fronthaul network 145 to switch/monitor 105 for subsequent routing to the appropriate BBU 120*a-c* or to the ADC/DAC unit 115 for subsequent processing and relay to the intended legacy BTS 110.

As mentioned above, switch/monitor 105 may allocate fronthaul bandwidth resources according to a pre-arranged priority and may take action to enforce its allocation by taking steps that are pre-arranged with a given network operator.

FIG. 5A-D illustrate various exemplary priority allocation solution 500*a-c* according to the disclosure, each having a distinct exemplary priority allocation 510*a-c*. The priority allocation solutions 500*a-c* may be generated by supervisor module 112 and maintained by policy enforcement module 215, for example.

Figure 5A:
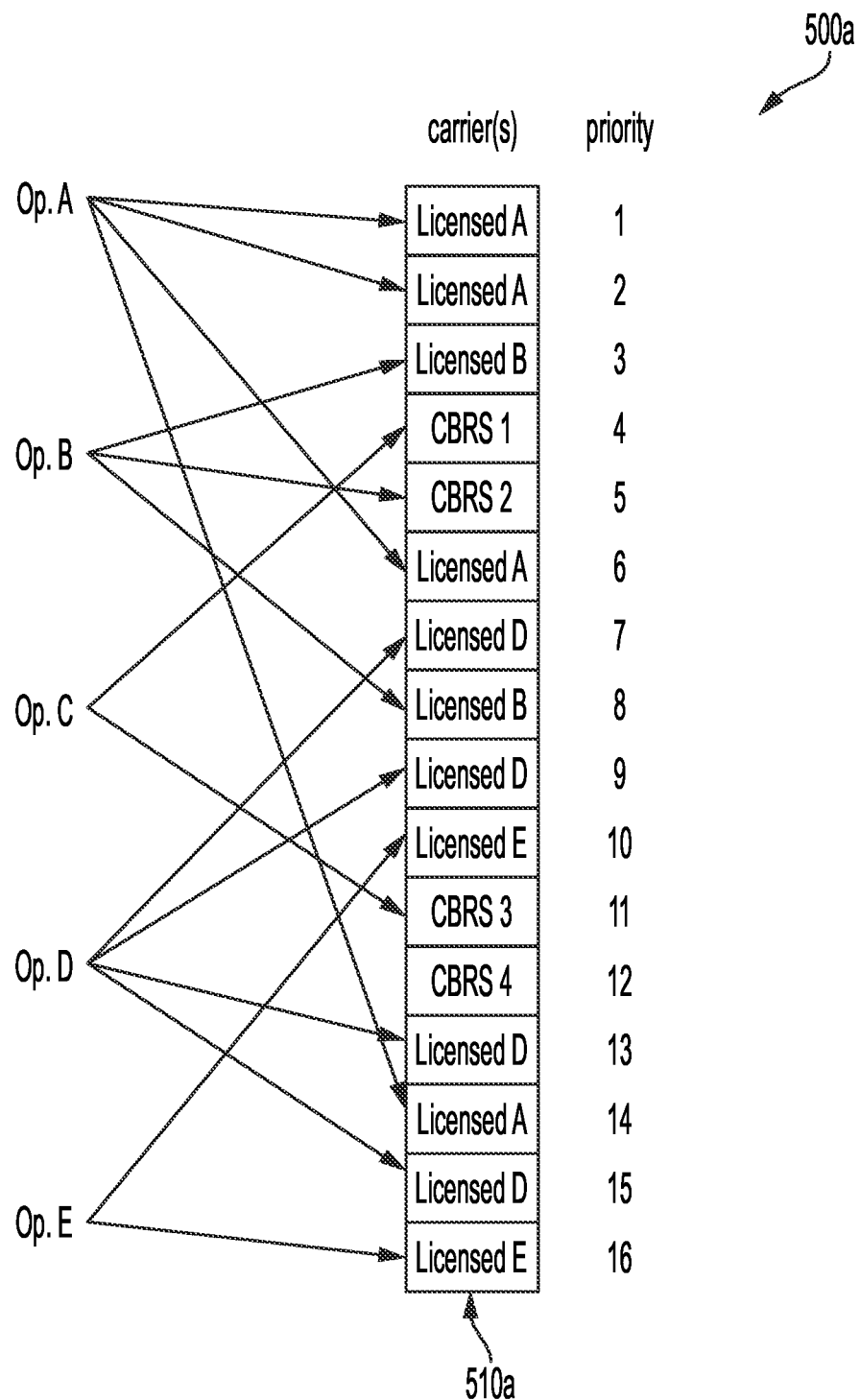
FIG. 5A illustrates a channel/carrier-based priority allocation solution according to the disclosure.

FIG. 5A illustrates a channel/carrier-based priority allocation solution 500*a* according to the disclosure. Under channel/carrier-based priority allocation solution 500*a*, available fronthaul bandwidth is assigned priority based on channel/carrier allocation 510*a*. In this scenario, the neutral host or operator of integrated network 100 contracts with network operators A-D such that network operators (Op.A, Op.B, Op.C, Op.D) pay for priority. In this example, Operator A has paid to have two of its licensed bands (channels or carriers) assigned highest priorities 1 and 2, and for a third licensed band to have a lower priority of 14. Under channel/carrier-based priority allocation solution 500*a*, switch/monitor 105 is agnostic regarding what traffic is going over which carrier/channel—it relies on the individual network operator (in this case, Operator A) to schedule appropriate traffic over which licensed band or channel/carrier for which it has arranged priority. Further to this example, Operator B has paid for one licensed band (or channel/carrier) to have a priority of 3, and another for priority 8. Further, Operator B may have arranged to obtain a CBRS channel, which it pays for a priority of 5. Operator C may be a private network operator that does not have any licensed spectrum. In this case, Operator C may obtain two CBRS channels, for which it pays to have a respective priority of 4 and 11. Each Operator A-E may be operating one or more BBUs that are providing 7.2× data, frequency domain eCPRI data, time domain eCPRI data, or F1 data (in case of a CU/DU split 5G gNodeB) to switch/monitor 105. One or more Operator A-E may also operate a legacy BTS 110, in which case its data in fronthaul network 145 is in the form of time domain eCPRI packets.

Under channel/carrier-based priority allocation solution 500a, traffic monitor 225 measures the available bandwidth of and identifies congestion anomalies in fronthaul network 145 (via congestion monitor 315); measures the fronthaul bandwidth usage of each channel/carrier of channel/carrier allocation 510a (via packet sniffer module 310); and provides this information overload control module 220 (via analytics engine module 320). With this information, overload control module 220 may provide feedback to BBUs 120a-c via feedback paths 122a-c. The feedback may include the amount of fronthaul bandwidth used by each of that operator's channel/carriers within channel/carrier allocation 510a, along with bandwidth availability information. The corresponding BBU 120a-c of that network operator may use this information for commanding its scheduler to adjust its throughput over a given channel/carrier to address any overuse of fronthaul bandwidth. In the case of a legacy BTS 110, which does not have a scheduler feedback mechanism, overload control module 220 may independently impede or restrict packet traffic for lower priority channel/carriers within channel/carrier allocation 510a.

Figure 5B:
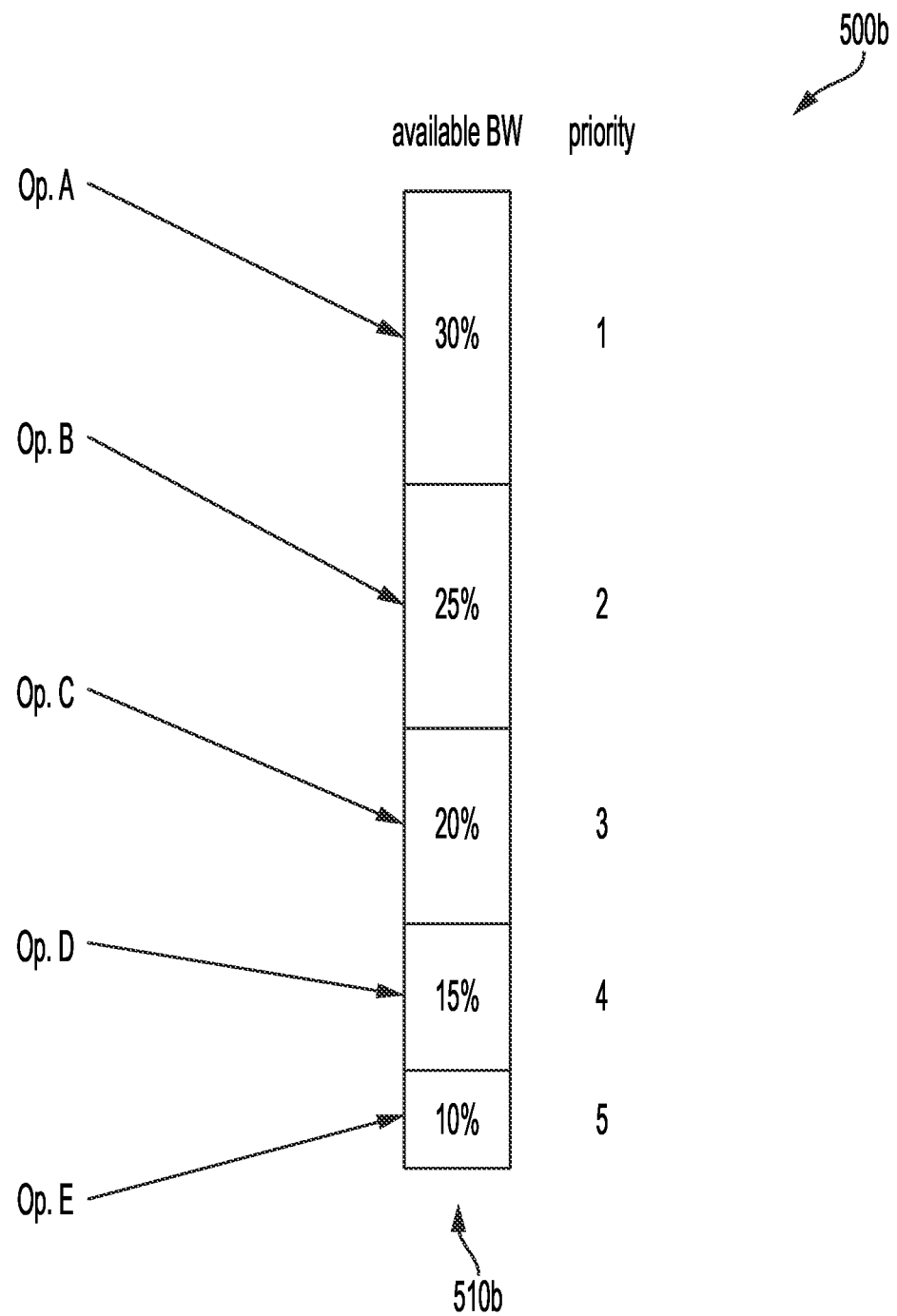
FIG. 5B illustrates a fixed percentage-based priority allocation solution according to the disclosure.

FIG. 5B illustrates a fixed percentage-based priority allocation solution 500b according to the disclosure. Under fixed percentage-based priority allocation solution 500b, each Operator A-E pays for a certain prioritized percentage 510b of the total available bandwidth of fronthaul network 145. Under fixed percentage-based priority allocation solution 500b, traffic monitor 225 measures the available bandwidth of fronthaul network 145. In doing so, congestion monitor 315 determines the overall available bandwidth of fronthaul network 145, and packet sniffer 310 determines the usage of the fronthaul bandwidth by each BBU 120a-c and BTS 110. Both of these modules 315/310 provide this information to analytics engine module 320, which computes the percentage of the available bandwidth used by each Operator A-E and provides this information to the overload control module 220. Overload control module 220 may then compare the computed percentages used by each of Operator A-E with the prioritized percentages 510b provided by policy enforcement module 215. If any of Operators A-D are using a greater percentage than its corresponding prioritized percentage 510b, then overload control module 220 may provide appropriate feedback via feedback path 122a-c to the appropriate BBU(s) 120a-c to inform its MAC scheduler to reduce its fronthaul traffic.

Figure 5C:
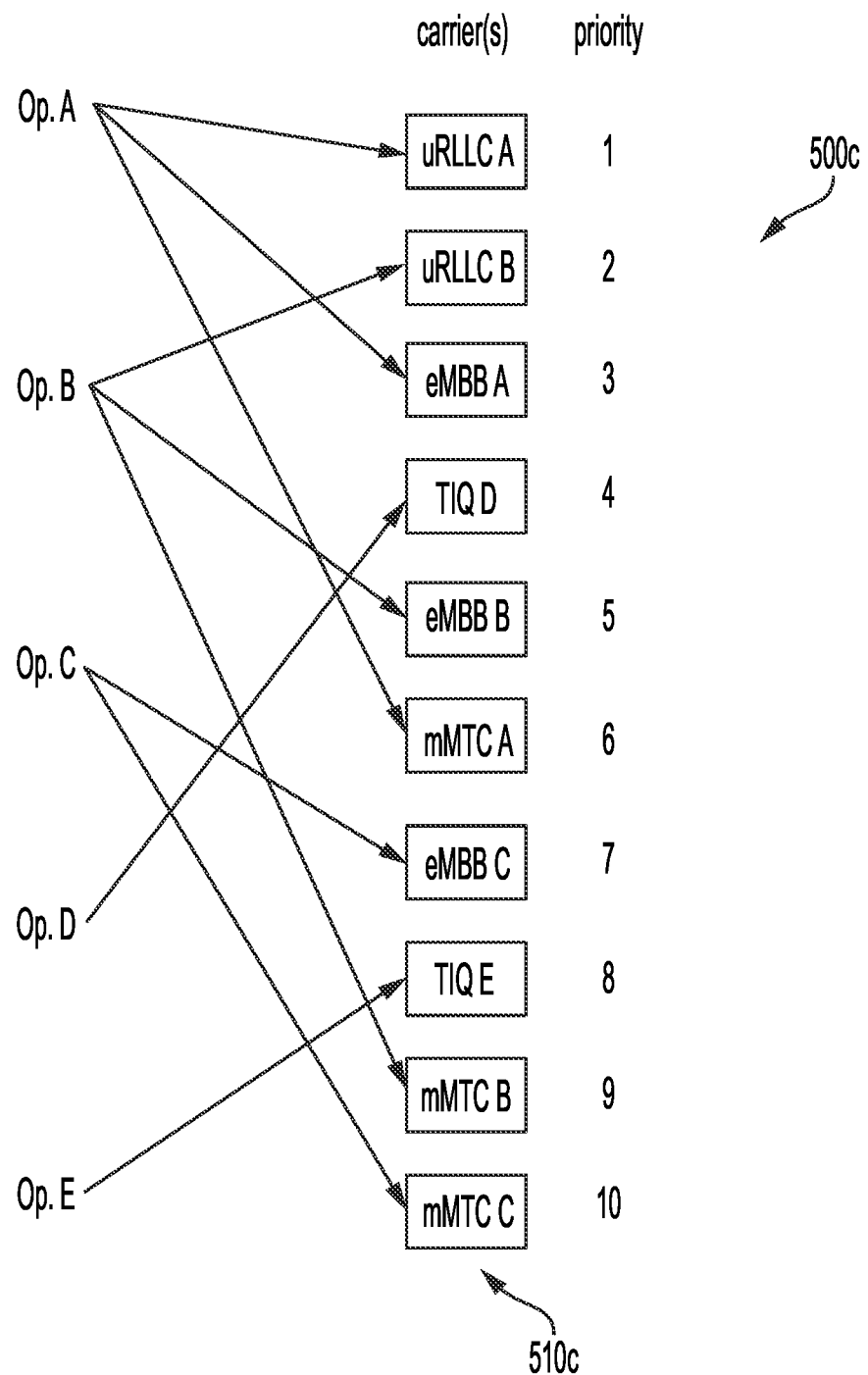
FIG. 5C illustrates a traffic type-based priority allocation according to the disclosure.

FIG. 5C illustrates a traffic type-based priority allocation 500c according to the disclosure. Under traffic type-based priority allocation 500c, each Operator A-E pays for a specific priority for its use of the fronthaul based on whether the given packet traffic is related to enhanced mobile broadband (eMBB), ultra-reliable low-latency communications (uRLLC), massive machine-type communications (mMTC), or if it is a time domain or frequency domain eCPRI representation of an RF signal. Each Operator A-E pays for a specific priority of usage of the bandwidth of the fronthaul network 145 according to a traffic type priority allocation 510c. In this example of a traffic type-based priority allocation 500c, Operator A pays for top priority for its uRLLC traffic, a priority of 3 for its eMBB traffic, and a lower priority of 6 for its mMTC traffic. Operator B pays for a priority of 2 for its eRLLC traffic; a priority of 5 for its eMBB traffic; and a priority of 9 for its mMTC traffic. Operator C does not provide any uRLLC communications for its customers, so it only obtains a priority of 7 for its eMBB traffic and a priority of 10 for its mMTC traffic. Operator D and Operator E may operate legacy BTSs 110, and as such their traffic is not differentiated by traffic type. Instead, Operator D and Operator E transmit and receive time domain or frequency domain representations of their respective BTS RF input/outputs 114. In this example 500c, Operator D has paid for a priority of 4 for its use of the bandwidth of fronthaul network 145; and Operator E has paid for a priority of 8. As mentioned earlier, the specific priorities allocated in this and the other examples 500a-c are purely exemplary, and that other specific allocation combinations are possible and within the scope of the disclosure.

Under traffic type-based priority allocation 500c, congestion monitor module 315 measures the available bandwidth of fronthaul network 145 and identifies a bottleneck or congestion anomaly. Concurrently, packet sniffer module 305 identifies the traffic type used by each BBU 120a-c and BTS 110. Both modules 305/310 provide this information to analytics engine module 320, which may execute instructions to correlate network congestion's latency impact on uRLLC traffic and may identify one or more traffic streams that are leading contributors to the traffic congestion. Regardless, analytics engine module 315 provides the information generated to overload control module 220. Overload control module 220 may provide feedback to one or more BBUs 120a-c via corresponding feedback path 122a-c to inform its corresponding MAC scheduler to reduce traffic usage for the traffic type that is causing the congestion anomaly. Overload control module 220 may do so according to the traffic type priority allocation 510c, whereby one or more lower priority traffic entries are reduced or shut down first. One will note that a given BTS 110 may not have the ability to throttle the fronthaul bandwidth usage of its eCPRI-based RF signal, in which case it may be an all-or-nothing situation. In that case, Operator D and Operator E may opt to pay for a higher priority.

In each of these examples 500a-c, overload control module 220 may (in addition to or as an alternative to providing feedback to the BBUs 120a-c) pre-emptively impede the packet traffic of one or more lower priority allocations (e.g., traffic type (500c), channel/carrier (500a), source/destination BBU/BTS (500b)).

Figure 6:
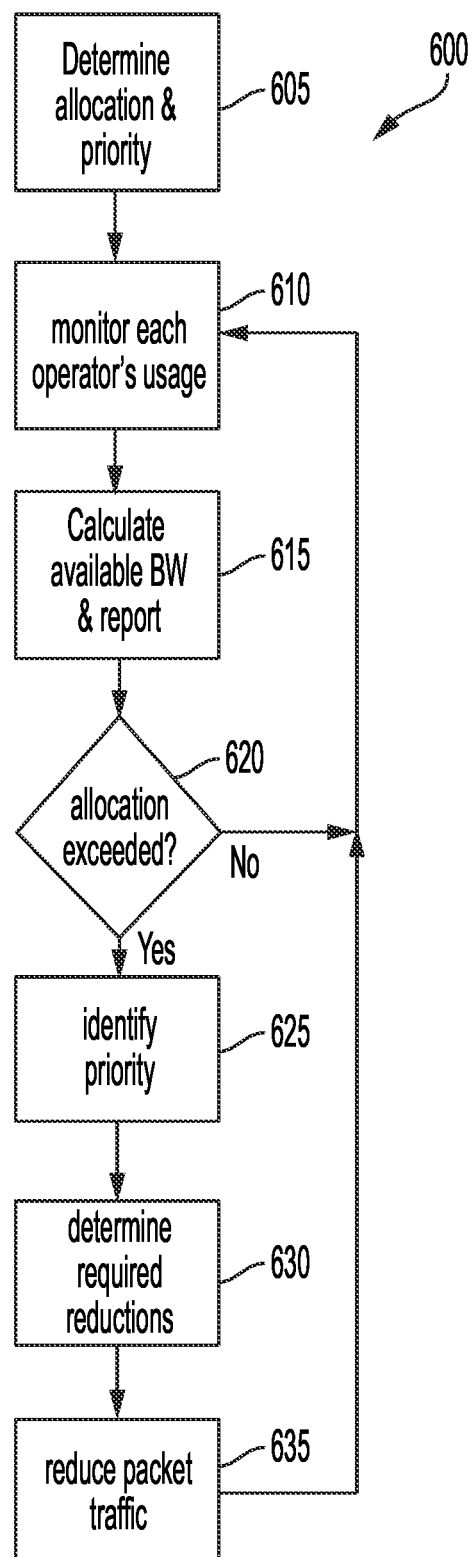
FIG. 6 illustrates an exemplary process for allocating fronthaul bandwidth according to a pre-arranged priority according to the disclosure.

FIG. 6 illustrates an exemplary process 600 for allocating fronthaul bandwidth according to a pre-arranged priority according to the disclosure. All of the steps of exemplary process 600 may be implemented as machine readable instructions that are executed on one or more processors, as described above with regard to software modules. Although the term "processor" or "the processor" is used in describing these processes, it will be understood that the term may apply to multiple processors that run on a single server or across several servers, including servers that are geographically distributed. The processor may execute process 600 at a preset interval, such as once per Transmit Time Interval (TTI), although other interval periods are possible and within the scope of the disclosure.

In step 605, the processor executes instructions to determine a priority allocation. Depending on how and where integrated radio network 100 is to be deployed, there may be a preference in using a particular allocation solution 500*a-c*. For example, if integrated network 100 is to be deployed where there will be a preponderance of 5G gNodeBs with significant opportunities for uRLLC communications (e.g., an automated factory or urban setting with operating autonomous vehicles), then a traffic type-based priority allocation 500*c* may be preferred. Alternatively, if integrated radio network 100 will engage with a disproportionate number of legacy BTSs 110, then channel/carrier-based priority allocation solution 500*a* may be more suitable. With the solution 500*a-c* established, the processor may execute instructions (e.g., in supervisor 112) to obtain input from each network operator regarding desired priority(ies) and instantiate a table of priorities 510*a-c* and map the priorities to each network operator. This table may be maintained in memory by policy enforcement module 215.

In step 610, the processor executes instructions to monitor each operator's usage of the fronthaul network 145. This may be performed by traffic monitor module 225 via packet sniffer 310. Depending on the solution 500*a-c* used, the processor may extract different metadata information from each examined packet as described above (e.g., VLAN tags, etc.). The processor may then buffer or locally store the information extracted from each packet.

In step 615, the processor may execute instructions to determine the available bandwidth and potentially identify congestion anomalies. In doing so, the processor may execute one or more of the techniques described above (e.g., eCPRI one-way packet delay, RFC2544, Y.1564, RFC5357, TWAMP, etc.). This may be done in coordination between congestion monitor module 315 and analytics engine module 320. The processor may execute instructions to buffer the determined information in local memory.

In step 620, the processor executes instructions to determine if one or more network operators has exceeded its allocation, or if the fronthaul network 145 is suffering from a congestion anomaly. This is the determination of whether switch/monitor 105 is required to intervene in the operation of integrated radio network 100. In determining if an allocation is exceeded, the processor may execute instructions to compute the percentage of fronthaul bandwidth used by each BBU 120*a-c* and legacy BTS 110 and compare each calculated percentage with the percentage allocation 510*b*. In the case of a fronthaul bottleneck or congestion anomaly, this would have been identified in step 615.

Note that the question of whether or not a network operator is violating (i.e., exceeding) its percentage allocation of fronthaul bandwidth is independent of whether the fronthaul network is experiencing a bottleneck or congestion anomaly. Even under nominal operating conditions, if one network operator's fronthaul bandwidth usage exceeds its prearranged allocation, then another network operator may be getting less usage of the fronthaul network bandwidth than the latter operator is entitled (according to its allocation).

If step 620 yields a negative result, then no intervention is necessary, and process 600 returns to step 610 and repeats at a predetermined interval, such as one TTI. If step 620 yields a positive result, then intervention is required, and process 600 proceeds to step 625.

In step 625, the processor executes instructions to identify priority and the extent to which action must be taken to resolve either an allocation violation or congestion anomaly.

In the case of a congestion anomaly, in the case of channel/carrier-based priority allocation solution 500*a*, the processor may execute instructions to determine how many low priority channels/carriers within channel/carrier allocation 510*a* are affected. For example, referring to FIG. 5A, Licensed Carrier E (priority 16) and Licensed Carrier D (priority 15) may be affected. This may be determined by executing instructions to determine what bandwidth usage needs to be shut off in order to resolve the congestion anomaly and compare that with the bandwidth usage of the priority 16 channel/carrier of Operator E. If eliminating this bandwidth usage (by shutting down the priority 16 channel/carrier of Operator E) is not sufficient to resolve the congestion anomaly, then the processor may determine the additional bandwidth usage of the priority 15 channel/carrier of Operator D (keep in mind that this is an example scenario). In this example, eliminating the bandwidth usage of these two channel/carriers is sufficient to resolve the congestion anomaly. In the case of percentage-based priority allocation solution 500*b*, the answer may have already been determined in step 615, in which case the violating network operator(s) is known. Further, although the violating network operator is identified, if it is operating more than one BBU 120*a-c* or legacy BTS 110, then the processor may execute instructions to identify which BBU 120*a-c* or legacy BTS 110 is predominating in excessive fronthaul bandwidth usage. In the case of traffic type-based priority allocation 500*c*, the processor may execute instructions to identify which of the lowest priority entries in the traffic type priority allocation 510*c* need to be addressed to resolve the fronthaul congestion anomaly. It may do so in a manner similar to that described above regarding channel/carrier-based priority allocation solution 500*a*.

In the case of an allocation violation, the processor executes instructions to identify which lower priority carriers or lower priority traffic types corresponding to the violation network operator that, if switched off, would resolve the allocation violation and return the network operator's fronthaul bandwidth usage percentage to allocation 500*b*.

In step 630, the processor executes instructions to determine the required course of action to resolve the fronthaul bottleneck or congestion anomaly, or the percentage allocation violation. If the affected channel/carriers or low priority traffic types identified in step 625 correspond to a BBU 120*a-c*, then the processor may execute instructions to provide feedback to the appropriate BBU 120*a-c* via feedback path 122*a-c* to notify the BBUs MAC scheduler. Similarly, if the network operator violating its percentage allocation has one or more BBUs 120*a-c*, then the processor may execute instructions to provide similar notification to the affected BBUs 120*a-c*. In these cases, overload control module 220 may rely on the individual affected fronthaul-aware BBUs 120*a-c* to take appropriate action through their respective MAC schedulers to reduce their fronthaul bandwidth usage as required. If, however, the affected channel/carriers identified in step 625 correspond to a legacy BTS 110, or if the network operator violating its percentage allocation only operates one or more legacy BTSs 110, then the processor may execute instructions to reduce the BTS's fronthaul bandwidth usage according to pre-arranged unilateral actions.

In step 635, the processor may execute instructions to reduce the packet traffic of the BBUs 120*a-c* or BTSs 110 as identified in step 630. If, in step 630, one or more BBUs 120a-c were identified as requiring intervention, the processor may execute instructions to provide feedback to the appropriate BBUs 120a-c accordingly, as described above. Additionally, depending on arrangements made with the affected network operator, and as specified in policy enforcement module 215, the processor may execute instructions to proactively reduce fronthaul bandwidth usage as needed. Depending on how priority is allocated (500a/500b/500c), then the processor may execute instructions so that overload control module 220 may issue instructions to switch 235 to block or impede all packets having a VLAN tag corresponding to channel/carrier, traffic type, or BBU/BTS identified in step 625. In a variation/addition, packet sniffer module 310 may identify packets associated with the low priority traffic type and tag them for mitigation at switch 235. In a variation, integrated radio network 100 may include a feedback path (not shown) between switch/monitor and 105 ADC/DAC 115, by which overload control module 220 may provide instructions to ADC/DAC 115 to cease conversion of predetermined lower priority carrier signals of the appropriate legacy BTS 110. It will be understood that such variations are possible and within the scope of the disclosure.

Figure 7:
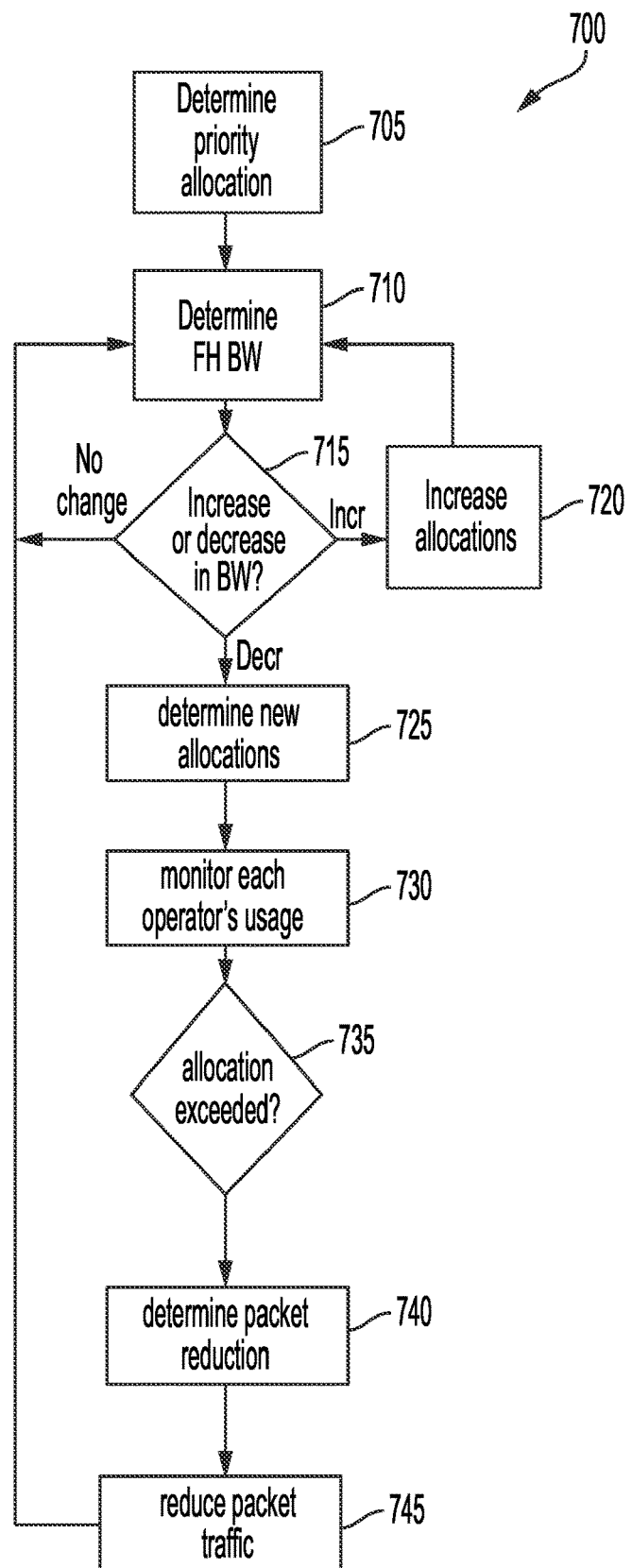
FIG. 7 illustrates an exemplary process for allocating fronthaul bandwidth according to fixed percentage-based priority allocation solution.

FIG. 7 illustrates an exemplary process 700 for allocating fronthaul bandwidth according to fixed percentage-based priority allocation solution 500b. All of the steps of exemplary process 700 may be implemented as machine readable instructions that are executed on one or more processors, as described above with regard to software modules.

In step 705, the processor executes instructions to determine a priority allocation. This step may be simpler than for the other priority allocation solutions because each network operator pays for a percentage of fronthaul bandwidth. With this done, the processor may execute instructions to store the percentage allocations 510b in policy enforcement module 215.

In step 710, the processor executes instructions to determine the currently available bandwidth of fronthaul network 145. It may do so in a manner similar to step 615 above.

In step 715, the processor executes instructions to determine if the available fronthaul bandwidth has increased or decreased since its previous determination. If this is the first iteration of process 700, policy enforcement module 215 may have an initial default baseline fronthaul bandwidth stored in its memory, in which case a first iteration of step 715 may involve comparing the fronthaul bandwidth calculated in step 710 with the initial default baseline value. Either way, the fronthaul bandwidth may have increased, decreased, or has not changed.

If the fronthaul bandwidth has increased, process 700 proceeds to step 720, in which the processor executes instructions to increase the baseline fronthaul bandwidth, thereby increasing the bandwidth allocations to each Operator A-E, based on their allocated percentages 510. If overload control module 220 is currently actively reducing any given Operator A-E's use of fronthaul bandwidth, as described with regard to step 635 of process 600, then the processor may execute instructions to overload controller module 220 to reduce or stop impeding a given Operator A-E's fronthaul usage.

If it is determined in step 715 that the fronthaul bandwidth has decreased, then process 700 may proceed to step 725, in which the processor executes instructions to determine a new bandwidth allocation to each of Operators A-E, due to a reduction in the baseline fronthaul bandwidth, and update these values stored in policy enforcement module 215.

In step 730, the processor executes instructions to monitor each Operator A-E's usage of the available fronthaul bandwidth by monitoring the specific usages by each BBU 120a-c and legacy BTS 110. This may be done in a manner similar to that described above regarding step 610 of process 600.

In step 735, the processor executes instructions to determine if any Operator A-E is exceeding (violating) its percentage allocation 510b of the newly reduced available fronthaul bandwidth. It may do so by calculating the current percentage used by each Operator A-E using the baseline fronthaul bandwidth calculated in step 710 and each Operator A-E usage determined in step 730 and comparing each to the new allocations calculated in step 725. If any of the Operators A-E are using fronthaul bandwidth beyond its allocation calculated in step 725, process 700 proceeds to step 740.

In step 740, the processor executes instructions to determine the extent required to reduce the fronthaul bandwidth used by the one or more operators that are determined to be violating their respective allocations in step 735. The required bandwidth reduction may take the form of shutting down a low priority channel/carrier, limiting or temporarily halting packet traffic for a low priority traffic type, or a combination of these actions.

In step 745, the processor executes instructions to reduce the packet traffic of the Operators A-E violating their respective allocations 510b. Reducing a violating operator's bandwidth usage may include one or more of the procedures described above. For example, if the violating operator has one or more BBUs 120a-c, the processor may execute instructions to provide feedback to its MAC scheduler via feedback path 122a-c. Alternatively, the processor may execute instructions for overload control module 220 to issue commands to packet sniffer module 310 and switch 235 to selectively impede or delay certain packet traffic corresponding to the BBU 120a-c and/or BTS 110 of the violating Operator A-E. Further, if switch has multiple parallel transmit buffers (e.g., allocated to different traffic types, channels/carriers, or network operators), then overload control module 220 may command switch 235 to throttle packet transmission by each of the buffers. In a variation, overload control module 220 may provide instructions to ADC/DAC 115 to cease conversion of predetermined lower priority carrier signals of the appropriate legacy BTS 110, as mentioned above regarding step 635.

What is claimed is:

1. A method for allocating fronthaul bandwidth resources among a plurality of network operators within a radio network, comprising:
    assigning a hierarchy of priorities to the plurality of network operators, wherein the heirarchy of priorities includes an allocation of fronthaul bandwidth resources;
    establishing packet-based communications between a plurality of baseband processors and a plurality of remote units, wherein each of the baseband processors corresponds to a one of the plurality of network operators and comprises an LTE eNodeB or a 5G gNodeB;
    routing a plurality of packet streams between each of the plurality of baseband processors and the plurality of remote units;
    monitoring fronthaul traffic and determining an amount of the fronthaul bandwidth being used by each of the plurality of baseband processors;
    identifying an allocation violation by one of the plurality of network operators, wherein the allocation violation occurs as a result of the violating network operator using a greater amount of fronthaul bandwidth than the violating network operator is permitted to use according to a pre-arranged amount of fronthaul bandwidth; and mitigating the network operator violation in accordance with pre-arranged mitigation measures by reducing the fronthaul bandwidth usage at least one baseband processor corresponding to the violating network operator.

2. The method of claim 1, wherein at least one or more of the baseband processors comprises an LTE eNodeB.

3. The method of claim 2, wherein the packet stream corresponding to the at least one or more LTE eNodeBs independently comprises one of a time domain eCPRI packet stream, a frequency domain eCPRI packet stream, and a split-PHY layer packet stream.

4. The method of claim 3, wherein the split-PHY layer packet stream comprises a 7.2x packet stream.

5. The method of claim 2, wherein the at least one or more LTE eNodeBs transmits and receives a CPRI data stream via a switch/monitor, and wherein the switch/monitor converts the CPRI data stream to/from an additional time domain eCPRI packet stream.

6. The method of claim 1, wherein at least one or more of the baseband processors comprises a 5G gNodeB.

7. The method of claim 6, wherein at least one 5G gNodeB comprises a central unit and a distributed unit, and wherein the packet stream corresponding to the at least one 5G gNodeB comprises a split-PHY layer packet stream.

8. The method of claim 7, wherein the split-PHY layer packet stream comprises a 7.2x packet stream.

9. The method of claim 7, wherein the at least one 5G gNodeB comprises a central unit, and wherein one or more counterpart remote units within the plurality of remote units includes a distributed unit, and wherein the packet stream corresponding to the at least one 5G gNodeB comprises an F1 packet stream.

10. The method of claim 1, wherein the routing comprises providing a synchronization packet stream to the plurality of baseband units and the plurality of remote units.

11. The method of claim 1, wherein the monitoring comprises identifying metadata within a subset of the plurality of packets within the plurality of packet streams.

12. The method of claim 11, wherein the metadata comprises a VLAN tag.

13. The method of claim 11, wherein the metadata indicates one of a time domain eCPRI packet stream, a frequency domain eCPRI packet stream, a 7.2x packet stream, and an F1 packet stream.

14. The method of claim 11, wherein the metadata indicates one of a network operator and a baseband processor.

15. The method of claim 14, wherein the metadata indicates one of a channel and a carrier frequency.

16. The method of claim 15, wherein the channel comprises a CBRS channel.

17. The method of claim 15, wherein the assigning a heirarchy of priorities to the plurality of network operators comprises assigning a priority to each one of a channel and a carrier corresponding to each network operator.

18. The method of claim 15 further comprises:
monitoring the fronthaul traffic for a congestion anomaly;
identifying the congestion anomaly; and
identifying one or more lower priority resources necessary to mitigate the congestion anomaly.

19. The method of claim 1, wherein two or more baseband processors correspond to the violating network operator, and wherein mitigating the network operator violation comprises reducing the fronthaul bandwidth usage of one of the two or more baseband processors based on a priority of the one baseband processor being lower than a priority of the other two or more baseband processors.

* * * * *